United States Patent
Wiggs (10) Patent No.: US 6,751,974 B1
(45) Date of Patent: Jun. 22, 2004

(54) SUB-SURFACE AND OPTIONALLY ACCESSIBLE DIRECT EXPANSION REFRIGERANT FLOW REGULATING DEVICE

(76) Inventor: B. Ryland Wiggs, 425 Sims La., Franklin, TN (US) 37069

(*) Notice: Subject to any disclaimer, the term of this patent is extended or adjusted under 35 U.S.C. 154(b) by 0 days.

(21) Appl. No.: 10/335,514

(22) Filed: Dec. 31, 2002

(51) Int. Cl.[7] .................. F25D 23/12; F25B 41/06
(52) U.S. Cl. .............................. 62/260; 62/527
(58) Field of Search .................. 62/260, 527, 526, 62/524, 324.6, 324.4, 117, 197, 471, 509

(56) References Cited

U.S. PATENT DOCUMENTS

| | | | |
|---|---|---|---|
| 4,741,388 A | | 5/1988 | Kuroiwa |
| 5,038,580 A | * | 8/1991 | Hart ........................... 62/324.6 |
| 5,313,804 A | * | 5/1994 | Kaye ............................ 62/160 |
| 5,461,876 A | | 10/1995 | Dressler |
| 5,564,282 A | * | 10/1996 | Kaye ............................ 62/160 |
| 5,623,986 A | | 4/1997 | Wiggs |
| 5,758,514 A | * | 6/1998 | Genung et al. ................ 62/471 |
| 5,771,700 A | * | 6/1998 | Cochran ........................ 62/117 |
| 5,816,314 A | | 10/1998 | Wiggs et al. |
| 5,875,644 A | * | 3/1999 | Ambs et al. ................ 62/324.6 |
| 5,946,928 A | | 9/1999 | Wiggs |
| 6,615,601 B1 | * | 9/2003 | Wiggs ........................ 62/235.1 |

* cited by examiner

*Primary Examiner*—William C. Doerrler
*Assistant Examiner*—Filip Zec
(74) *Attorney, Agent, or Firm*—Waddey & Patterson, P.C.; Mark J. Patterson; Phillip E. Walker (57) ABSTRACT

A sub-surface direct expansion geothermal heat exchange unit, which can be placed in sub-surface ground and/or water, consisting of at least one smaller interior diameter refrigerant liquid/fluid transport line with an optional vertically oriented U bend at the bottom, operatively connected to at least one larger interior diameter refrigerant liquid/fluid transport line, with at least one refrigerant flow metering device installed at either an accessible location in the liquid/fluid line or at the sub-surface point where the liquid/fluid line connects with the vapor/fluid line, for use when the system is operating in the heating mode, together with a refrigerant flow metering device by-pass means so as to enable additional refrigerant fluid flow around the refrigerant metering device when the system is operating in the cooling mode.

35 Claims, 2 Drawing Sheets

SUB-SURFACE AND OPTIONALLY ACCESSIBLE DIRECT EXPANSION REFRIGERANT FLOW REGULATING DEVICE

BACKGROUND OF THE INVENTION

The present invention relates to an improved sub-surface, or in-ground/in-water, heat exchange means incorporating a sub-surface heating mode refrigerant flow regulating device and a cooling mode refrigerant flow regulating device by-pass means, so as to enable additional refrigerant flow around the regulating device in the cooling mode, for use in association with any direct expansion heating/cooling system, or partial geothermal heating/cooling system, utilizing sub-surface heat exchange elements as a primary or supplemental source of heat transfer.

Ground source/water source heat exchange systems typically utilize fluid-filled closed loops of tubing buried in the ground, or submerged in a body of water, so as to either absorb heat from, or to reject heat into, the naturally occurring geothermal mass and/or water surrounding the buried or submerged tubing. Water-source heating/cooling systems typically circulate, via a water pump, water, or water with anti-freeze, in plastic underground geothermal tubing so as to transfer heat to or from the ground, with a second heat exchange step utilizing a refrigerant to transfer heat to or from the water, and with a third heat exchange step utilizing an electric fan to transfer heat to or from the refrigerant to heat or cool interior air space.

Direct expansion ground source heat exchange systems, where the refrigerant transport lines are placed directly in the sub-surface ground and/or water, typically circulate a refrigerant fluid, such as R-22, in sub-surface refrigerant lines, typically comprised of copper tubing, to transfer heat to or from the sub-surface elements, and only require a second heat exchange step to transfer heat to or from the interior air space by means of an electric fan. Consequently, direct expansion systems are generally more efficient than water-source systems because of less heat exchange steps and because no water pump energy expenditure is required. Further, since copper is a better heat conductor than most plastics, and since the refrigerant fluid circulating within the copper tubing of a direct expansion system generally has a greater temperature differential with the surrounding ground than the water circulating within the plastic tubing of a water-source system, generally, less excavation and drilling is required, and installation costs are lower, with a direct expansion system than with a water-source system.

While most in-ground/in-water heat exchange designs are feasible, various improvements have been developed intended to enhance overall system operational efficiencies. Several such design improvements are taught in U.S. Pat. No. 5,623,986 to Wiggs, and in U.S. Pat. No. 5,816,314 to Wiggs, et al., the disclosures of which are incorporated herein by reference. These predecessor designs basically teach the utilization of a spiraled fluid supply line subjected to naturally surrounding geothermal temperatures, with a fully insulated fluid return line. However, since only the fluid return line is insulated, and since both the supply and return lines are all the same size, without a dedicated smaller sized refrigerant liquid/fluid transport line and a dedicated larger sized refrigerant vapor/fluid transport line so as to facilitate appropriate refrigerant supply and return capacity in a deep well (greater than 100 feet deep) direct expansion application, these predecessor designs are intended for a near-surface (within about 5 to 100 feet of the surface) direct expansion system application, when operating in a reverse cycle mode.

Other predecessor vertically oriented geothermal heat exchange designs are disclosed by U.S. Pat. No. 5,461,876 to Dressler, and by U.S. Pat. No. 4,741,388 to Kuriowa. Dressler's '876 patent teaches the utilization of several designs of an in-ground fluid supply and return line, with both the fluid and supply lines shown as being the same size, and not distinguished in the claims, but neglects to insulate either the fluid return line or the fluid supply line, thereby subjecting the heat gained or lost by the circulating fluid to a "short-circuiting" effect as the supply and return lines come into close proximity with one another at various heat transfer points. Dressler also discloses the alternative use of a pair of concentric tubes, with one tube being within the core of the other, with the inner tube surrounded by insulation or a vacuum. While this multiple concentric tube design reduces the "short-circuiting" effect, it is practically difficult to build and maintain and could be functionally cost-prohibitive, and it does not have a dedicated liquid line and a dedicated vapor line. Kuriowa's preceding '388 patent is similar to Dressler's subsequent spiral around a central line claim, but better, because Kuriowa insulates a portion of the return line, via surrounding it with insulation, thereby reducing the "short-circuiting" effect. However, Kuriowa does not have a dedicated liquid line and a dedicated vapor line. The lowermost fluid reservoir claimed by Kuriowa in all of his designs can work in a water-source geothermal system, but can be functionally impractical in a deep well direct expansion system, potentially resulting in system operational refrigerant charge imbalances, compressor oil collection/retention problems, accumulations of refrigerant vapor pockets due to the extra-large interior volume, and the like. Kuriowa also shows a concentric tube design preceding Dressler's, but it is subject to the same problems as Dressler's. Further, both Dressler's and Kuriowa's designs are impractical in a reverse-cycle, deep well, direct expansion system operation since neither of their primary designs provide for, or claim, an insulated smaller interior volume sized liquid line and an un-insulated larger interior volume sized vapor line, which are necessary to facilitate the system's most efficient operational refrigerant charge and the system's compressor's efficient refrigerant supply and return capacities.

Generally, a design which insulates the supply line from the return line and still permits both lines to retain natural geothermal heat exchange exposure, such as a thermally exposed, centrally insulated, geothermal heat exchange unit, as taught by Wiggs in U.S. patent application Ser. No. 10/127,517, which is incorporated herein by reference, would be preferable over non-insulated lines and over designs which insulate a portion of one sub-surface line. However, while Wiggs' '517 Application is an improvement over prior art, in a sub-surface soil application, it could still be subject to some minor short-circuiting effects and to some potentially adverse vapor formation in the liquid line at undesirable locations or times.

In direct expansion applications, supply and return refrigerant lines may be defined based upon whether they supply warmed refrigerant to the system's compressor and return hot refrigerant to the ground to be cooled, or based upon the designated direction of the hot vapor refrigerant leaving the system's compressor unit, which is the more common designation in the trade. For purposes of this present invention, the more common definition will be utilized. Hence, supply and return refrigerant lines are herein defined based upon whether, in the heating mode, warmed refrigerant vapor is being returned to the system's compressor, after acquiring heat from the sub-surface elements, in which event the larger interior diameter, sub-surface, vapor/fluid line is the return line and evaporator, and the smaller interior diameter, sub-surface, liquid/fluid line, operatively connected from the interior air handler to the sub-surface vapor line, is the supply line; or whether, in the cooling mode, hot refrigerant vapor is being supplied to the larger interior diameter, sub-surface, vapor fluid line from the system's compressor, in which event the larger interior diameter, sub-surface, vapor/fluid line is the supply line and condenser, and the smaller interior diameter, sub-surface, liquid/fluid line is the return line, via returning cooled liquid refrigerant to the interior air handler, as is well understood by those skilled in the trade. In the heating mode the ground is the evaporator, and in the cooling mode, the ground is the condenser.

None of the above-said prior art addresses an improved means of designing a direct expansion system for a reverse-cycle heating/cooling system operation via insulating only one smaller interior diameter, sub-surface, line, designed primarily for liquid/fluid refrigerant transport, which smaller line may be utilized as a supply line in the heating mode and as a return line in the cooling mode, and of not insulating at least one, or two or more combined, larger interior diameter, sub-surface, lines, designed primarily for vapor/fluid transport, which can provide expanded surface area thermal heat transfer as return lines in the heating mode and as supply lines in the cooling mode. While at least two, larger combined interior diameter, vapor/fluid refrigerant transport lines, operatively connected to one, smaller interior diameter, liquid/fluid refrigerant transport line would generally be preferable because of the resulting expanded, and spaced apart, heat transfer surface contact area, instances may arise where only one, larger interior diameter, vapor/fluid refrigerant line, operatively connected to one, smaller interior diameter, liquid/fluid refrigerant line could also be preferable, or where a larger interior diameter vapor/fluid refrigerant line is spiraled around a centrally located, insulated, smaller diameter liquid/fluid refrigerant line could be preferable.

Where a close to zero-tolerance short-circuiting effect is desirable, and where the time and expense of constructing other designs, such as a concentric tube within a tube, or a spiraled single fluid return line and single fluid supply line of the same sized interior diameters, could be financially, or functionally and/or efficiently, prohibitive in a deep well direct expansion application, and where the thermal exposure area of a single geothermal heat transfer line, or tube, could be too centralized and too heat transfer restrictive, a system design improvement would be preferable which incorporated a cost-effective installation method, capable of operating in a reverse-cycle mode in a sub-surface direct expansion application, with close to zero-tolerance short-circuiting effect, with expanded sub-surface heat transfer surface area capacities, and with a liquid refrigerant trap means at the bottom of the sub-surface heat exchange lines to assist in preventing refrigerant vapor migration, from the refrigerant vapor line into the refrigerant liquid line, as is taught in Wiggs' pending U.S. patent application Ser. No. 10/251,190, which is incorporated herein by reference. However, none of the above-said prior art addresses the most efficient means of regulating the refrigerant fluid flow through the sub-surface refrigerant transport lines when a direct expansion system is operating in the heating mode, and of permitting optimum refrigerant flow rate around the regulating device when the reverse-cycle system is operating in the cooling mode.

Virtually all high-efficiency heat pump systems, including direct expansion heat pumps, utilize thermal expansion valves to regulate refrigerant flow through the evaporator, which is the exterior heat exchanger in the heating mode, and which is the interior air handler in the cooling mode. In the heating mode, for example, the thermal expansion valve is typically a self-adjusting thermal expansion valve, which valve will generally and ideally be situated in the refrigerant transport line at a point as close as possible to where the refrigerant fluid enters the evaporator, and which valve is operatively connected to a floating bulb. The floating bulb senses superheat levels and sends signals to the valve to adjust the refrigerant flow rate so as to obtain efficient system operation, depending on changing heating load and superheat conditions. The operation of self-adjusting thermal expansion valves is well understood by those skilled in the art.

While use of self-adjusting thermal expansion valves is appropriate in the heating mode for air-source and water-source heat pump systems, where the copper heat exchange tubing is all in relatively close proximity and where the valves are readily accessible for servicing, the common use of such self-adjusting thermal expansion valves in direct expansion heat pump systems can be relatively inefficient because the design refrigerant flow tubing length in the evaporator is often 100 feet, or more. Hence, in a typical direct expansion system, operating in the heating mode, any self-adjustment by the thermal expansion valve takes an inordinate amount of time to take effect and to be sensed by the valve. The valve, during the interim, continues to modulate and fluctuate refrigerant flow rates as it "hunts" for an optimum setting. This "hunting" results in periodic inefficient system operation and in periodic undesirable decreases in supply air temperatures.

The typical utilization of self-adjusting thermal expansion valves in the heating mode of direct expansion heat pump systems presents problems other than the "hunting" concerns. Namely, since such valves are bulky, and may periodically be in need of servicing or replacement, they must be installed in an accessible location, which has historically either been inside the compressor unit box, far from the actual evaporator, or near the ground surface, as close as possible to the point where the refrigerant enters the sub-surface evaporator, but still some distance away from the actual sub-surface evaporator. This is a problem because to operate at maximum efficiencies, the expansion device should generally be as close as possible to the actual evaporator.

Thus, the historical perception by some, that a self-adjusting thermal expansion valve should be utilized in the heating mode of a direct expansion system because it provides the highest operational efficiencies, is subject to serious question because of the necessary distance it must be located from the evaporator and because of inherent "hunting" problems. In fact, the longer and/or the deeper the sub-surface evaporator heat exchange lines are in a sub-surface direct expansion system, the greater the "hunting" problem becomes with a self-adjusting thermal expansion valve.

However, the use of a self-adjusting thermal expansion valve is generally always appropriate in the cooling mode of a high-efficiency heat pump system, regardless of the type of heat pump utilized, including direct expansion heat pumps, since the valve and the floating bulb, which are readily accessible for servicing, can generally always efficiently function together because of the relatively close proximity of the heat exchange tubing within the interior air handler.

One alternative method of regulating refrigerant flow in the heating mode of a direct expansion heat pump is to install a manually adjusting thermal expansion valve in lieu of a self-adjusting thermal expansion valve. Such a valve will eliminate hunting problems since it will not automatically adjust its own setting. However, such a manually adjusting valve generally must still be placed in an accessible location, which could be hundreds of feet above the actual evaporator in a DWDX application. Further, experience has shown that such a manually adjusting valve, when utilized in a near-surface direct expansion application (within 100 feet of the surface), typically requires at least two manual adjustments per year in order for the system to provide adequate and efficient heat. One such adjustment is required in the fall, at the beginning of the heating season, when the ground surrounding the sub-surface heat exchange tubing is relatively warm, as a result of summer conditions and the system's preceding cooling mode operation, which has been rejecting heat into the ground area surrounding the sub-surface heat exchange tubing. Generally, at least one other adjustment is required during the winter, as the ground surrounding the sub-surface heat exchange tubing has cooled down to winter-time operational temperatures as a result of heat being extracted by the system in its heating mode of operation. A reasonable manual expansion valve setting for a direct expansion system, when the sub-surface ground is warm, is not the same reasonable setting for when the ground is cool. The construction, the operation, and the reasonable settings of a manual adjusting thermal expansion valve is well understood by those skilled in the art.

Thus, the use of a manually adjusting thermal expansion valve in a direct expansion system, particularly in a DWDX system, while eliminating the hunting problem of a self-adjusting thermal expansion valve, has its problems. A manually adjusting valve is comparatively bulky, must be installed in an above ground and/or accessible location, and, as explained, typically must be adjusted and serviced at least twice per year.

Another alternative method of regulating refrigerant flow in the heating mode is to install a refrigerant fluid distributor with a fixed restrictive hole, or orifice, inside, and typically at the center of, a floating, bullet-shaped, finned, piston, which device is commonly referred to by several designations, such as a piston metering device, a single piston metering device, a floating piston assembly, and a pin restrictor. In the heating mode, the piston, within a casing/housing, moves toward a restrictive seal, which only permits refrigerant fluid flow through the piston hole, or orifice, in the center, thereby regulating the amount of refrigerant entering the evaporator. In the cooling mode, as the refrigerant flow changes direction, the piston moves back, or floats back, toward a less restrictive seal which permits refrigerant fluid flow through the hole, or orifice, as well as additionally through the gaps between the exterior fins on the piston. The specific construction and operation of piston metering devices, including the casings/housings within which they are enclosed, are well understood by those skilled in the art. Since a piston metering device has a fixed orifice, the refrigerant fluid flow rate cannot be adjusted, other than by pressure, so as to accommodate changing exterior load requirements, and has, therefore, generally been considered less efficient and has generally not been used in high-efficiency systems such as direct expansion heat pumps. Instead, many direct expansion heat pump systems utilize self-adjusting thermal expansion valves because of their well-known advantages and improved performance in other heat pump designs, which advantages have previously been commonly, although incorrectly, believed by some to equally apply in a direct expansion application.

In fact, a piston metering device can be more efficient in the heating mode of a direct expansion application than expansion valves, particularly in a DWDX application, because the ground at a depth of more than 100 feet is seasonally less affected by changing, and widely varying, above-ground, near surface, atmospheric temperatures, and hunting, or seasonal valve setting adjustments, for an optimum setting may not be necessary. A piston metering device will eliminate hunting concerns, and, since it is not bulky, can be installed in either an above-ground accessible location, or directly at the commencement of the evaporator segment of a sub-surface direct expansion system where efficiencies are generally best.

However, a reason exists for not using a conventional piston metering device alone in a reverse cycle direct expansion heating/cooling system. Testing has also shown that a properly sized single piston metering devise in a deep well direct expansion ("DWDX") system (deep well is herein defined as where sub-surface heat exchange lines are in excess of 100 feet deep), can impair the optimum refrigerant fluid flow when the system is operating in its reverse cycle cooling mode, as the available refrigerant fluid passageway through the hole in the center of the bullet, together with the available fluid passageway around the outside of the bullet through the fins, can be inadequate to maintain an optimum cooling design refrigerant fluid flow rate. This is because the added pressure, via gravity upon the liquid refrigerant in a DWDX application, can dictate the use of a slightly undersized conventional piston metering device, which device would normally be sized to match the compressor in a conventional heat pump application, but which slightly undersized device in a DWDX application, because of the additional liquid pressure, still achieves the compressor design flow rate in the heating mode, but which undersized device can be a potential impairment to the compressor design flow rate in the cooling mode.

Further, if one elects to install a piston metering device in an above ground and/or an accessible location, the piston size can be easily changed to accommodate changing temperature conditions, or multiple such devices of varying sizes can be installed in series with a pressure and/or temperature means to automatically activate the preferred sized device and to deactivate the rest, by means of a remotely actuated valve such as a solenoid valves, or the like. The installation and operation of remotely actuated valves, such as solenoid valves, and the like, are well understood by those skilled in the art, and, therefore, are not shown herein.

Consequently, a means to provide an efficient refrigerant flow regulating device in a direct expansion, reverse-cycle, heating/cooling system, operating in the heating mode, without "hunting" problems, which device does not necessarily require maintenance access, which device is either in close proximity to the actual evaporator or which device can optionally compensate for significant changes in sub-surface temperature environments without the need for manual adjustments, and which device does not inhibit the full refrigerant flow in a reverse cycle cooling mode operation, would be preferable. The present invention provides a solution to these preferable objectives, as hereinafter more fully described.

SUMMARY OF THE INVENTION

It is an object of the present invention to further enhance and improve the efficiency of predecessor direct expansion, geothermal, reverse-cycle, heating/cooling system designs. This is accomplished by means of providing a piston metering device apparatus to efficiently regulate refrigerant fluid flow in the sub-surface evaporator segment of a direct expansion heating/cooling system when operating in the heating mode, which device can be optionally designed to accommodate significant sub-surface temperature fluctuations without manual adjustments, and which device does not necessarily require maintenance access, while also providing a non-restrictive refrigerant fluid piston metering device by-pass means, so as not to inhibit reverse-cycle system operational efficiencies when the system is operating in the cooling mode.

The present invention teaches to accomplish the stated preferable objectives by one of several alternative means. The first means consists of at least one smaller, preferably insulated, interior diameter liquid/fluid refrigerant transport line connecting to at least one larger interior diameter vapor/fluid refrigerant transport line at a point near the bottom of a direct expansion system borehole, where at least one single piston metering device, within a piston metering device casing/housing, is respectively installed at each respective point where a smaller interior diameter liquid/fluid line connects to at least one larger interior diameter vapor/fluid line. When the system is operating in the heating mode, this will provide for an even refrigerant fluid distribution, in a relatively stable sub-surface temperature environment, particularly at DWDX depths in excess of 100 feet, and will eliminate the need for an inefficient, "hunting", thermal expansion valve, which valve must be generally placed a significant, and operationally inefficient, distance away from the point of the actual respective evaporator/vapor line connection point so as to provide accessibility for service/repair work.

As a design example, in a vertically oriented, three-ton system capacity, borehole, which is 375 feet deep, an insulated liquid/fluid refrigerant transport tube, such as a ½" O.D. copper refrigerant tube, is installed about 375 feet deep to a point at or near the bottom of the borehole. The bottom end of the liquid/fluid refrigerant transport tube is preferably bent in a U shape, so that the U shaped lower end of the liquid line extends approximately one foot above the base of the borehole, and is then operatively connected to at least one vapor/fluid refrigerant transport tube, such as a ⅞" O.D. copper refrigerant tube, of about 374 feet deep for example. The preferable, but not mandatory, U bend in the liquid line acts as both a liquid and a compressor lubricating oil trap, thereby helping to prevent refrigerant migration into the liquid line, and helping to ensure an adequate return of compressor lubricating oil to the compressor. The liquid/fluid refrigerant transport line has a smaller interior diameter than the larger interior diameter vapor/fluid refrigerant transport line. The vapor/fluid refrigerant transport tube, or line, is in direct thermal contact with the sub-surface elements, which elements may consist of one or more of earth, rock, clay, sand, water, anti-freeze, water and anti-freeze, fluid, thermal grout (such as a thermal grout 85 mixture), or the like. The smaller interior diameter liquid/fluid refrigerant transport tube is insulated in most applications so as to avoid a "short-circuiting" effect of the geothermal heat gain/loss since the vapor and the liquid lines are typically in close proximity to one another in a deep well direct expansion, or analogous, heating/cooling application.

Further, as explained, testing has shown that, while single piston metering devices work well in the heating mode of a direct expansion application, as described herein, when installed at the connection point between a smaller interior diameter sub-surface liquid/fluid refrigerant line and a larger interior diameter sub-surface vapor/fluid refrigerant line, a single piston metering device, particularly in a DWDX application, can be too restrictive, and may not provide adequate refrigerant fluid flow rate capacity when a reverse-cycle direct expansion system is operating in the cooling mode. Consequently, the present invention includes means for providing an adequate piston metering device refrigerant fluid by-pass for use in the cooling mode operation.

One such refrigerant fluid by-pass means encompasses an extra smaller interior diameter liquid/fluid refrigerant transport line by-passing the single piston metering device in the cooling mode, installed at a point within about six inches to one foot above the single piston metering device, which extra by-pass line is automatically open in the cooling mode, but which extra by-pass line is automatically closed by a check valve, or the like, when the system is operating in the heating mode. While the extra by-pass line may be opened and closed by a remotely actuated solenoid valve, by a single piston valve (identical to a single piston metering device, but with no central orifice opening), or by a check valve, and the like, as is well understood by those skilled in the trade, a single piston valve or a check valve would generally be preferable for utilization in a direct expansion application because of their simple operation and general lack of need for control wiring and/or maintenance/servicing access.

Another alternative, and presently preferred, means for providing an adequate piston metering device refrigerant fluid by-pass for use in the cooling mode operation consists of utilizing an oversized single piston metering device, so as to permit sufficient design flow rate around the device in the cooling mode, and sealing part of the center orifice, so as to restrict the flow to the desired output in the heating mode. For example, for a 2 ton DWDX system, which would normally utilize a 058 size piston metering device, one could utilize a standard 3 ton single piston metering device, such as a size 067, which would permit an approximate 0.88 gallon per minute flow rate in the cooling mode, which would be entirely sufficient for the operational design of a 2 ton scroll compressor with a 0.59 gallon per minute refrigerant flow rate design, and then seal, with silver solder (15%silver solder) or the like, about 12% or more, depending on depths and refrigerant pressures, of the center orifice opening of the 3 ton device, so as to provide the lesser and optimal desired flow rate when the system is operating in the heating mode.

Alternatively, a single piston metering device, within a piston metering device casing/housing, can be installed in the smaller interior diameter liquid line of a direct expansion system at any accessible above-ground, or very near-surface, location, rather than in the preferable close proximity to the actual evaporator connection. Such an accessible installation will permit servicing and piston size changes if desired, with only a modest potential system operational efficiency reduction, while still eliminating the "hunting" problem encountered with self-adjusting thermal expansion valves. Such an above-ground, or very near surface, accessible installation will not require the use of a U shaped liquid trap immediately prior to the installation of the single piston metering device.

Further, when significant seasonal changes in the geothermal temperatures, surrounding the sub-surface heat exchange tubing of a direct expansion heating/cooling system, are anticipated, at least two single piston metering devices of differing sizes, within their respective casing/housing, can be installed in above-ground and/or accessible near-surface locations, in conjunction with solenoid valves and temperature and/or pressure controlled switches designed to activate the desired piston metering device of the appropriate size for the applicable sub-surface temperature conditions, and designed to isolate and de-activate all other piston metering devices of differing sizes. The operation and construction of such temperature and/or pressure remotely activated valves, such as solenoid valves or the like, designed to activate and to isolate selected and respective single piston metering devices, are well understood by those skilled in the art, and, therefore, are not shown herein.

Other customary direct expansion refrigerant system apparatus and materials would be utilized in a direct expansion system application, including a receiver, a thermal expansion valve for the interior air handler, an accumulator, and an air-handler, for example as described in U.S. Pat. No. 5,946,928 to Wiggs, which is incorporated herein by reference, all of which are well-known to those in the art and are therefore not shown herein.

The subject invention may be utilized as an individual unit, or by means of multiple units connected via headers/distributors, connecting sub-surface tubing in series or in parallel by means of common fluid supply and return refrigerant lines, to increase operational efficiencies and/or to reduce installation costs in a number of applications, as is well understood by those skilled in the art. The invention may be utilized to assist in efficiently heating or cooling air by means of a forced air heating/cooling system, or to assist in efficiently heating or cooling water in a hydronic heating/cooling system, as is also well understood by those skilled in the art.

BRIEF DESCRIPTION OF THE DRAWINGS

There are shown in the drawings embodiments of the invention as presently preferred. It should be understood, however, that since any number of smaller interior diameter liquid/fluid refrigerant transport lines could be utilized and respectively operatively connected, in a variety of arrangements, such as spiraled, or the like, to any number of larger interior diameter refrigerant transport lines, with each respective liquid/vapor refrigerant transport line connection incorporating a sub-surface metering device, since the geothermal heat exchange unit with a sub-surface metering device described can be connected and installed to other such units by means of refrigerant headers, or distributors, in one of series or in parallel, and since the metering device shown can be installed in an accessible above-ground, or near surface, location alone or in conjunction with alternatively sized metering devices, the operational selection of which are controlled by temperature and/or pressure sensors opening/closing solenoid valves, the invention is not limited to the simple exemplary arrangements and instrumentalities shown in the drawings, which demonstrate one single smaller interior diameter liquid/fluid refrigerant transport line operatively connected to one larger interior diameter, vapor/fluid refrigerant transport line, incorporating a single piston metering device and a cooling mode by-pass liquid refrigerant line with a check valve, wherein.

DESCRIPTION OF THE PREFERRED EMBODIMENTS

The following detailed description is of the best presently contemplated mode of carrying out the invention. The description is not intended in a limiting sense, and is made solely for the purpose of illustrating the general principles of the invention. The various features and advantages of the present invention may be more readily understood with reference to the following detailed description taken in conjunction with the accompanying drawings.

Figure 1:
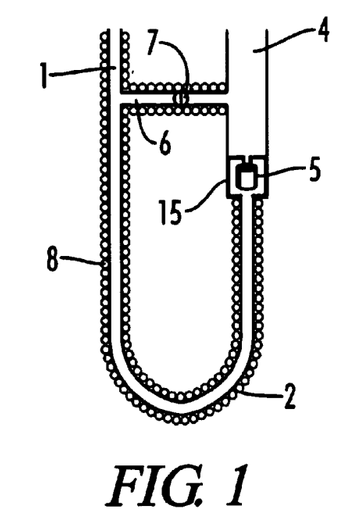
FIG. 1 is a side view of the lower U bend segment of a smaller interior diameter, insulated, liquid/fluid refrigerant transport line, where it connects with a larger interior diameter vapor/fluid refrigerant transport line, with a single piston metering device installed at the point where the liquid/fluid line connects with the vapor/fluid line, for use when the system is operating in the heating mode, together with a by-pass liquid refrigerant transport line and a check valve so as to enable additional refrigerant fluid flow around the single piston metering device when the system is operating in the cooling mode.

Referring now to the drawings in detail, where like numerals refer to like parts or elements, there is shown in FIG. 1 a side view of the lower segment of a smaller interior diameter liquid/fluid refrigerant transport line 1, showing a U bend 2 in the liquid line 2 to the point where the casing/housing 15 of a single piston metering device 5 connects the liquid/fluid line 1 with a larger interior diameter vapor/fluid refrigerant transport line 4, for use when a direct expansion heating/cooling system (not shown) is operating in the heating mode, together with a by-pass line 6 and a check valve 7 so as to enable additional refrigerant fluid flow around the single piston metering device 5 only when the system is operating in the cooling mode. The smaller interior diameter liquid/fluid refrigerant line 1 is shown as being insulated 8.

The check valve 7, which is shown in a closed position for operation in the heating mode, is well understood by those skilled in the art. The check valve 7 will automatically open when the system is operating in the cooling mode, and will automatically close, by means of the refrigerant fluid flow direction, when the system is operating in the heating mode, as is well understood by those skilled in the art. Also as well understood by those skilled in the art, the function of the check valve 7 could be accomplished by any other suitable flow restriction device, such as a remotely actuated valve, a single piston valve, or the like (not shown), although use of a check valve 7 would generally be preferable since the flow restriction device utilized would be difficult to access in a deep well direct expansion application, and since no valve signal/power control lines and generally no maintenance would be required for a check valve 7.

Figure 2:
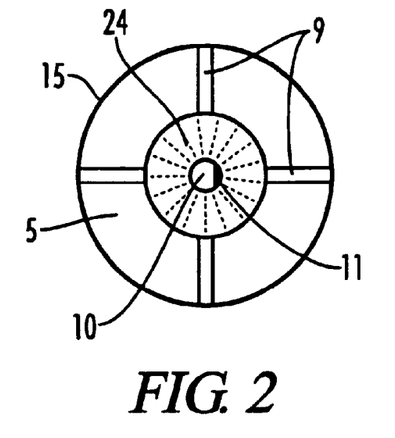
FIG. 2 is a front view of an oversized single piston metering device, with fins, where a portion of the center orifice opening has been sealed shut.

FIG. 2 shows a front view of an oversized single piston metering device 5, including a piston 24 with fins 9, where the center orifice opening 10 in the piston 24 has been partially sealed shut with silver solder 11, all within a casing/housing 15.

Figure 3:
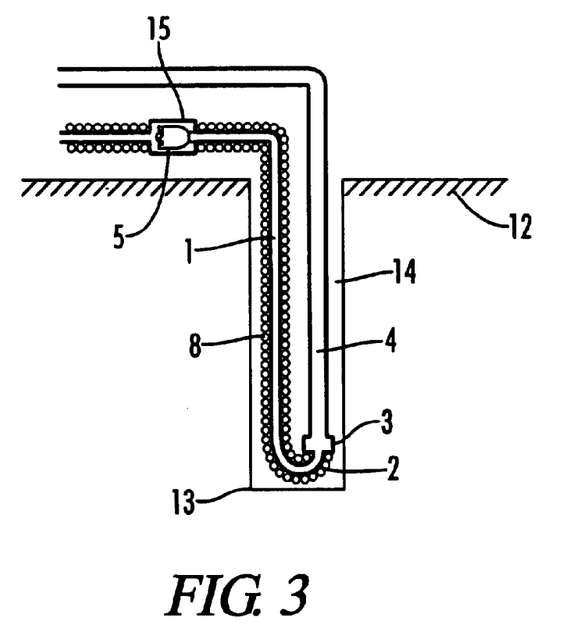
FIG. 3 is a side view of a smaller interior diameter liquid/fluid refrigerant transport line run parallel to, and above, the ground, with a single piston metering device installed above the ground, with the liquid line being insulated and extending to the bottom of a deep well, where the liquid line forms a U bend at the bottom of the deep well and is connected to a larger interior diameter vapor/fluid refrigerant transport line by means of a coupling device.

FIG. 3 shows a side view of a smaller interior diameter liquid/fluid refrigerant transport line 1 run parallel to, and above, the ground 12, with a single piston metering device 5, within a piston metering device casing 15, all installed above the ground 12, with the liquid line 1 being insulated 8 and extending to the bottom 13 of a deep well/borehole 14, where the liquid line 1 forms a U bend 2 near the bottom 13 of the deep well/borehole 14 and is connected to a larger interior diameter vapor/fluid refrigerant transport line 4 by means of a refrigerant line coupling device 3.

Figure 4:
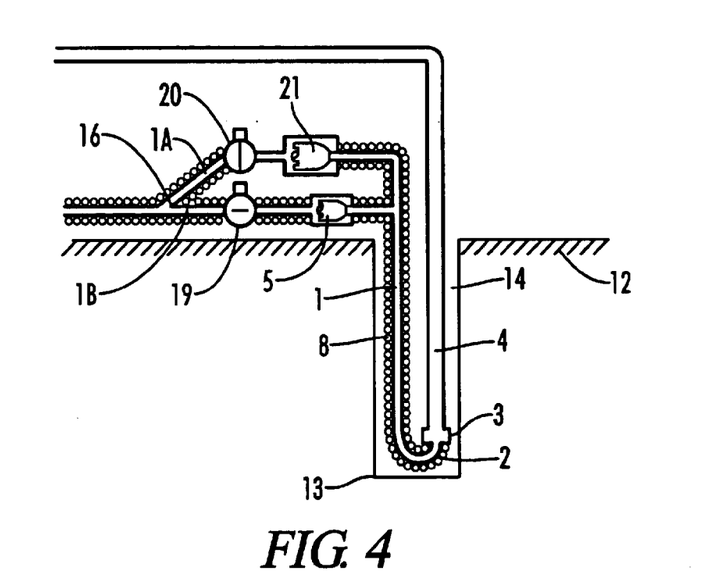
FIG. 4 shows a side view of how multiple, and different sized, refrigerant flow regulating metering devices, 5 and 21, are disposed in an above-surface and an accessible portion of the liquid refrigerant transport line.

FIG. 4 shows a side view of how multiple, and different sized, refrigerant flow regulating metering devices, 5 and 21, are disposed in an above-surface and an accessible portion of the liquid refrigerant transport line 1. Specifically, a smaller interior diameter liquid/fluid refrigerant transport line 1 extends parallel to, and above, the ground 12 to a point where it splits, by means of a common liquid refrigerant fluid transport line header/distributor 16, into two, multiple, respective liquid lines 1A and 1B, both of which are above ground 12 and accessible for servicing. The refrigerant flow in the upper liquid line 1A is shown as being controlled by a remotely actuated valve in a closed position 20, such as a closed solenoid valve or the like. When the closed valve 20 is activated in a closed position, no refrigerant fluid (not shown) can travel through a secondary, and larger, single piston metering device 21 into the deep well 14 with a greater refrigerant fluid flow rate.

The refrigerant flow in liquid line 1B is shown as being controlled by a remotely actuated valve in an open position 19, such as an open solenoid valve or the like. When the open valve 19 is activated in an open position, refrigerant fluid can travel, at a lesser refrigerant fluid flow rate, through a primary, and smaller, single piston metering device 5 into the deep well 14, by means of the primary liquid line 1. The liquid lines are all insulated 8 with rubatex or the like. The liquid line 1 is attached, by means of a refrigerant line coupling device 3, to an un-insulated larger interior diameter vapor/fluid refrigerant transport line 4, where geothermal heat transfer takes place within the deep well 14. The liquid line 1 is shown as being coupled 3 to the vapor line 4 at the bottom 13 of a deep well/borehole 14. The respective remotely actuated valves, 19 and 20, are valves such as solenoid valves, and are activated to either open or close by means of at least one of pre-determined refrigerant fluid temperatures and pressures, so as to provide reasonable heating efficiencies during significantly changing system load and/or sub-surface geothermal temperature conditions. The connection, operation, power supply hook-ups, and settings of remotely actuated valves, such as solenoid valves, are well understood by those skilled in the art, and, therefore, are not shown herein. Further, while only two multiple metering devices, 5 and 21, are shown herein, the same, but extended to three or more, installation procedure would be utilized if one elected to utilize three, or more, multiple sized metering devices so as to automatically fine-tune the direct expansion system's heating mode operation efficiencies to a higher degree under less significant changes in conditions.

Figure 5:
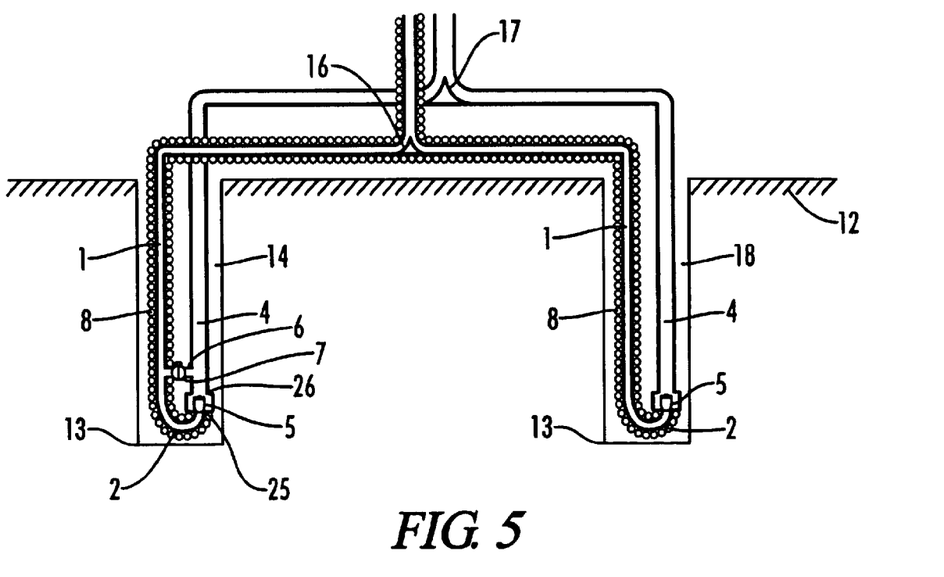
FIG. 5 shows a side view of a plurality of sub-surface heat exchange means, with a common liquid refrigerant fluid transport line header/distributor, and with a common vapor refrigerant fluid transport line header/distributor.

FIG. 5 shows a side view of a plurality of sub-surface heat exchange means. More specifically, a smaller interior diameter liquid/fluid refrigerant transport line 1 is divided into two segments by a common liquid refrigerant fluid transport line header/distributor 16 at an above ground 12, accessible location. Each respectively divided liquid line 1 is then shown as being inserted into the bottom 13 of a deep well/borehole 14. The liquid lines 1 are all insulated. Each respective liquid line 1 forms a U bend 2 at the bottom 13 of the deep well/borehole 14 and is then coupled, by means of a respective refrigerant line coupling device 3 to a larger interior diameter vapor/fluid refrigerant transport line 4. Each respective vapor line 4, which is not insulated for geothermal heat transfer purposes, extends up through the deep well/borehole 18, to an above ground 12 and accessible location, where each respective vapor line is joined by means of a common vapor refrigerant fluid transport line header/distributor 17, and then travels to the remainder of the direct expansion system, such as the compressor, interior air handler, and the like, as is well understood by those skilled in the art, and, therefore, is not shown herein.

For further purposes of illustration, the sub-surface heat exchange means on the left is shown with a single piston metering device 5 attaching the lower sub-surface end portion 25 of the liquid refrigerant transport line 1, just above a U bend 2 in the liquid line 1, to the lower sub-surface distal end portion of the vapor refrigerant transport line 26, with a refrigerant fluid by-pass line 6 shown just above the single piston metering device 5, and with a closed check valve 7 located in the by-pass line 6, so as to restrict refrigerant fluid flow through the by-pass line 6 when the direct expansion heating/cooling system (not shown) is operating in the heating mode, but so as to permit refrigerant fluid flow when the refrigerant fluid is traveling in the reverse direction when the system is operating in the cooling mode.

Again, for further purposes of illustration, the sub-surface heat exchange means on the right is shown with a single piston metering device 5 attaching the lower sub-surface end portion 25 of the liquid refrigerant transport line 1, just above a U bend 2 in the liquid line 1, to the lower sub-surface distal end portion of the vapor refrigerant transport line 26, with the metering device 5 being an oversized metering device 5, with a partially silver solder 11, or the like, filled center orifice 10 as shown and described in FIG. 2, which is incorporated herein by reference.

As can be seen, any appropriate metering device 5, can be utilized for heating mode operation, so long as an adequate refrigerant fluid flow is insured in the cooling mode when the direct expansion heating/cooling system's refrigerant fluid flow through the respective sub-surface heat exchange vapor refrigerant transport lines 4 is traveling in the reverse direction from that of the system's heating mode operation. Further, while only two sub-surface heat exchange means are shown herein, the same, but extended to three or more, installation procedure would be utilized if one elected to utilize three, or more, sub-surface heat exchange means so as to shorten the otherwise requisite depth of only one deep well/borehole.

What is claimed is:

1. A direct expansion heat pump system geothermal heat exchange arrangement comprising:

a smaller interior diameter liquid refrigerant fluid transport line having at least a lower segment of the liquid refrigerant fluid transport line positioned in a subsurface location;

a larger interior diameter vapor refrigerant fluid transport line having a lower distal end disposed proximate to the lower end segment of the liquid fluid transport line in the sub-surface location, with at least a lower segment of the vapor refrigerant fluid transport line in thermal contact with subsurface material in the subsurface location; and a refrigerant flow regulator disposed in the subsurface location and operatively coupling the lower end segment of the liquid refrigerant fluid transport line to the lower distal end of the vapor refrigerant fluid transport line.

2. The geothermal heat exchange arrangement of claim 1 wherein the distal portion of the lower segment of the liquid refrigerant fluid transport line forms a vertically oriented U bend, said U bend disposed below the coupling joining the liquid refrigerant fluid transport line to the refrigerant flow regulator.

3. The geothermal heat exchange arrangement of claim 1 wherein the refrigerant flow regulator is a metering device.

4. The geothermal heat exchange arrangement of claim 3 wherein the metering device is a single piston metering device.

5. The geothermal heat exchange arrangement of claim 1 wherein the liquid refrigerant fluid transport line is insulated.

6. The geothermal heat exchange arrangement of claim 1 wherein the liquid refrigerant fluid transport line and the vapor fluid transport line are adapted for operative connection to a closed-loop direct expansion heat pump system.

7. The geothermal heat exchange arrangement of claim 1 further comprising:
a by-pass refrigerant fluid transport line disposed in the subsurface location and operatively coupling the lower segment of the liquid refrigerant fluid transport line to the lower segment of the vapor refrigerant fluid transport line; and
a flow restriction device disposed in the by-pass refrigerant fluid transport line so as to permit refrigerant fluid flow from the vapor refrigerant fluid transport line through the by-pass line and into the liquid refrigerant fluid transport line, but blocking refrigerant flow through the by-pass line in the reverse direction.

8. The geothermal heat exchange arrangement of claim 7 wherein the flow restriction device is a check valve.

9. The geothermal heat exchange arrangement of claim 7 wherein the flow restriction device is a remotely actuated valve.

10. The geothermal heat exchange arrangement of claim 7 wherein the flow restriction device is a single piston valve.

11. The geothermal heat exchange arrangement of claim 7 wherein the by-pass refrigerant fluid transport line is integral to the refrigerant flow regulator.

12. The geothermal heat exchange arrangement of claim 3 wherein the metering device is an oversized single piston metering device with a partially sealed center orifice opening.

13. The geothermal heat exchange arrangement of claim 1 wherein the sub-surface refrigerant transfer tubing is placed within a well/borehole where heat conductive fill material is in thermal contact with both the sub-surface vapor refrigerant fluid transport line and the natural sub-surface geothermal surroundings.

14. A direct expansion heat pump system geothermal heat exchange arrangement comprising:
a common liquid refrigerant header/distributor means;
a common vapor refrigerant header/distributor means;
a plurality of sub-surface heat exchange means, each comprising
a smaller interior diameter liquid refrigerant fluid transport line having at least a lower segment of the liquid refrigerant fluid transport line positioned in a sub-surface location, and
a larger interior diameter vapor refrigerant fluid transport line having a lower distal end disposed proximate to the lower end segment of the liquid fluid transport line in the sub-surface location, with at least a lower segment of the vapor refrigerant fluid transport line in thermal contact with subsurface material in the subsurface location; and
a refrigerant flow regulator disposed in the subsurface location and operatively coupling the lower end segment of the liquid refrigerant fluid transport line to the lower distal end of the vapor refrigerant fluid transport line; and
wherein each liquid refrigerant fluid transport line is operatively connected to the liquid refrigerant header/distributor means and each vapor fluid transport line is operatively connected to the common vapor refrigerant header/distributor means.

15. The geothermal heat exchange arrangement of claim 14 wherein the refrigerant flow regulator is a metering device.

16. The geothermal heat exchange arrangement of claim 15 wherein the metering device is a single piston metering device.

17. The geothermal heat exchange arrangement of claim 16 further comprising:
a by-pass refrigerant fluid transport line disposed in the subsurface location and operatively coupling the lower segment of the liquid refrigerant fluid transport line to the lower segment of the vapor refrigerant fluid transport line at a point above the refrigerant flow regulator; and
a flow restriction device disposed in the by-pass refrigerant fluid transport line so as to permit refrigerant fluid flow from the vapor refrigerant fluid transport line through the by-pass line and into the liquid refrigerant fluid transport line, but blocking refrigerant flow through the by-pass line in the reverse direction.

18. The geothermal heat exchange arrangement of claim 14 wherein the liquid refrigerant fluid transport line is insulated.

19. The geothermal heat exchange unit of arrangement 15 wherein the metering device is an oversized single piston metering device with a partially sealed center orifice opening.

20. A direct expansion heat pump system geothermal heat exchange arrangement comprising:
a smaller interior diameter liquid refrigerant fluid transport line having at least a lower segment of the liquid refrigerant fluid transport line positioned in a subsurface location;
a larger interior diameter vapor refrigerant fluid transport line having a lower distal end disposed proximate to the lower end segment of the liquid fluid transport line in the sub-surface location, with at least a lower segment of the vapor refrigerant fluid transport line in thermal contact with subsurface material in the subsurface location; and
at least one refrigerant flow regulator disposed in one of an above surface and accessible location of the liquid refrigerant fluid transport line.

21. The geothermal heat exchange arrangement of claim 20 wherein the refrigerant flow regulator is a metering device.

22. The geothermal heat exchange arrangement of claim 21 wherein the metering device is a single piston metering device.

23. The geothermal heat exchange arrangement of claim 20 wherein the liquid refrigerant fluid transport line is insulated.

24. The geothermal heat exchange arrangement of claim 20 wherein the liquid refrigerant fluid transport line and the vapor fluid transport line are adapted for operative connection to a closed-loop direct expansion heat pump system.

25. The geothermal heat exchange arrangement of claim 20 further comprising:
   a by-pass refrigerant fluid transport line disposed in the one of above surface and accessible location and operatively coupling the segment of the liquid refrigerant fluid transport line before the refrigerant flow regulator to the segment of the liquid refrigerant fluid transport line after the refrigerant flow regulator; and
   a flow restriction device disposed in the by-pass refrigerant fluid transport line so as to permit refrigerant fluid flow from the cooling mode operation of the direct expansion heat pump system through the by-pass line, but blocking refrigerant flow through the by-pass line in the reverse direction in the heating mode operation.

26. The geothermal heat exchange arrangement of claim 25 wherein the flow restriction device is a check valve.

27. The geothermal heat exchange arrangement of claim 25 wherein the flow restriction device is a remotely actuated valve.

28. The geothermal heat exchange arrangement of claim 25 wherein the flow restriction device is a single piston valve.

29. The geothermal heat exchange arrangement of claim 25 wherein the by-pass refrigerant fluid transport line is integral to the refrigerant flow regulator.

30. The geothermal heat exchange arrangement of claim 21 wherein the metering device is an oversized single piston metering device with a partially sealed center orifice opening.

31. The geothermal heat exchange arrangement of claim 20 wherein the sub-surface refrigerant transfer tubing is placed within a well/borehole where heat conductive fill material is in thermal contact with both the sub-surface vapor refrigerant fluid transport line and the natural sub-surface geothermal surroundings.

32. The geothermal heat exchange arrangement of claim 20 wherein multiple refrigerant flow regulating metering devices are disposed in one of an above-surface and an accessible portion of the liquid refrigerant transport line, with each respective refrigerant flow regulating metering device being one of activated and deactivated by means of at least one remotely actuated valve, which remotely actuated valve is controlled by at least one of a temperature sensor and a pressure sensor.

33. The geothermal heat exchange arrangement of claim 32 wherein a by-pass refrigerant fluid transport line is disposed in one of an above-surface and an accessible portion of the liquid refrigerant transport line and operatively coupling a point in the liquid line above all respective metering devices with a point in the liquid line below all respective metering devices; and wherein
   a check valve is disposed in the by-pass refrigerant fluid transport line, with the respective check valve operable to enable additional refrigerant fluid flow around each respective refrigerant metering device when the system is operating in cooling mode and to block refrigerant fluid around each respective refrigerant metering device when the system is operating in heating mode.

34. The geothermal heat exchange arrangement of claim 32 wherein each respective metering device is a single piston metering device.

35. The geothermal heat exchange arrangement of claim 32 wherein each respective metering device is an oversized single piston metering device with a partially sealed center orifice opening.

* * * * *